Dec. 25, 1956  D. A. WEBSTER  2,775,685
CONCEALED WELD STUD
Filed Nov. 20, 1953

INVENTOR.
Dale A. Webster
BY Clyde H. Haynes
his atty.

United States Patent Office 2,775,685
Patented Dec. 25, 1956

2,775,685

CONCEALED WELD STUD

Dale A. Webster, Elyria, Ohio, assignor to Gregory Industries, Inc., Detroit, Mich., a corporation of Michigan Application November 20, 1953, Serial No. 393,475

4 Claims. (Cl. 219—99)

This invention relates to a concealed weld stud and to the method of welding the same to a work piece.

Studs have been welded to a work piece using an arc and a ferrule which molded molten metal into a weld fillet around the base of the stud and at the work piece. Many times difficulty has been encountered in applications where it was necessary to have the weld without a fillet around the base of the stud. In some instances these weld fillets had to be ground off until the surface of the work piece and the surface of the stud met in a sharp corner. Weld fillets are very hard and machine tools have a very high mortality rate when cutting weld fillet metal. This meant the use of grinding wheels which was an expensive and tedious operation to get the desired sharp corner between the surface of the stud and the surface of the work plate. Difficulty has also been encountered where a large diameter stud was to be welded to a relatively thin plate. If the whole end of the stud was melted by an arc, the arc would also burn through the plate to which the stud was to be welded.

The stud would then tend to push out of the backside of the plate when the stud was plunged into the molten pool.

Applicant has solved these problems by providing the stud with an outer wall which seats tightly against the surface of the work piece and a pin within the outer wall which is welded to the work piece. After the weld is completed, the pin, the weld fillet around the pin, and the ferrule are entirely concealed by the outer wall. The outer wall also provides a clean sharp corner between the surface of the stud and the surface of the work piece.

One of the objects of the present invention is to weld a stud to a work plate without any of the weld fillet showing. Another object of the invention is to provide a method for welding a concealed weld stud to the work plate.

A further object of the invention is to provide a welding stud which may be welded to the work plate with the outer surface of the stud meeting the surface of the work piece at a sharp corner and with the weld fillet completely concealed by the stud and work piece.

A still further object of the invention is to provide a large diameter stud which can be stud welded to a thin plate.

Further objects of the invention will become apparent from the following description and claims when taken in conjunction with the attached drawings in which:

Figure 1:
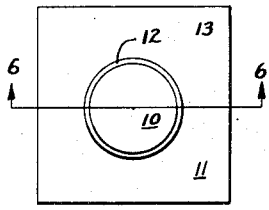
Figure 1 is a top view of a concealed weld stud welded to a plate.
Figure 3:
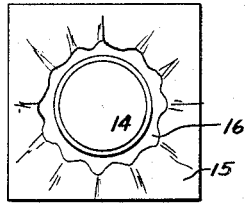
Figure 3 is a top view of a stud welded to a plate showing weld fillet which was obtained prior to this invention.
Figure 2:
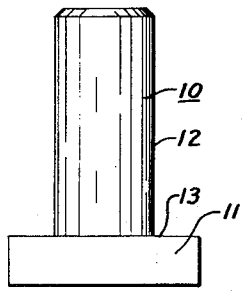
Figure 2 is a front elevational view of the stud of Figure 1.
Figure 4:
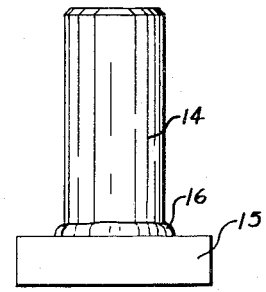
Figure 4 is a front view of the stud of Figure 3.

The finished appearance of a concealed weld stud welded to a plate or work piece is illustrated in Figures 1 and 2. A concealed weld stud 10 is securely welded to the plate or work piece 11 with the outer surface 12 of the stud 10 meeting the surface 13 of the work piece 11 at a corner. In contrast Figures 3 and 4 illustrate a common stud 14 welded to a work plate 15 with the weld fillet 16 extending around the base of the stud. The present invention completely eliminates the weld fillet 16 from around the outside base of the stud and provides a weld fillet concealed within the stud.

In this description and the appended claims, the term stud is used in its broad meaning to include posts, rods, bars or members of circular, square, rectangular or other cross sectional shapes which may be adapted to stud welding. The concealed weld studs may be welded with commercially available equipment, such as the stud welding gun illustrated in Patent No. 2,413,189 issued to T. Nelson, December 24, 1946.

Figure 5:
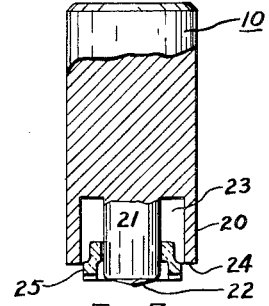
Figure 5 is a cross sectional view of a concealed weld stud.
Figure 6:
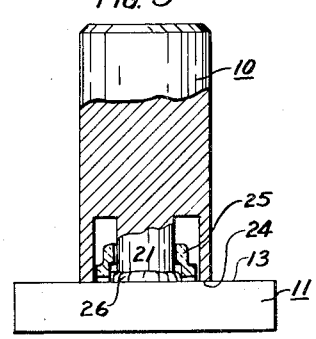
Figure 6 is a sectional view taken along the line 6—6 of Figure 1.

The stud 10 is illustrated in cross section in Figure 5. The stud 10 has an outer wall 20 and a pin 21 terminating beyond the wall in a weld end 22. The circumferential or outer wall 20 and the pin 21 are spaced apart to provide a ferrule receiving recess 23 disposed completely within the outer wall 20 and extending around the pin. Generally the pin is concentric with the outer wall since this design is the most economical to manufacture. In certain cases the pin may not be concentric with the wall. The outer wall 20 terminates in an end edge surface 24 which seats against the surface 13 of the work piece 14 as illustrated in Figure 6 after the stud 10 has been welded to the work piece.

To facilitate welding, a ceramic or heat resistant ferrule 25 of any suitable design is placed over the pin 21. The ferrule 25 encloses the welding end 22 of the pin 21 during the formation and duration of an arc between weld end 22 and the work piece 14 and helps mold a weld fillet 26 around the pin 21. The ferrule has an annular cavity to receive and mold the molten metal into a fillet around the base of the pin. This cavity has a volume substantially equal to or greater than the volume of that portion of the pin extending beyond the wall of the stud. As is illustrated in Figure 6, the weld fillet 26 is completely concealed within the stud 10 and the ferrule cavity 23 after the welding takes place.

Figure 7:
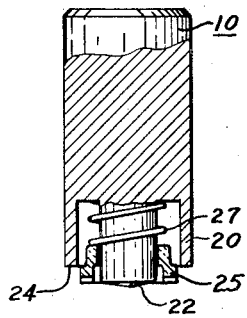
Figure 7 is a sectional view of a concealed weld stud illustrating the use of a spring to hold the ferrule.

In some instances it is necessary to weld the studs overhead or in a position in which the weight of the ferrule 25 will not hold it in place against the plate 14 during welding. In these instances the ferrule spring 27 is inserted in the ferrule cavity 23 (see Figure 7) to urge the ferrule out of the ferrule receiving recess 23 and against the work plate. The spring remains with the ferrule concealed in the stud after the welding takes place.

Figure 8:
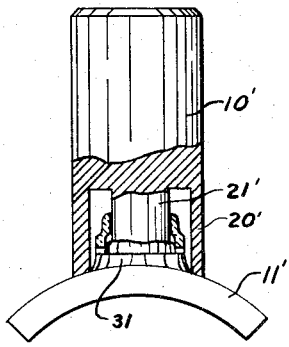
Figure 8 is an elevational view of a concealed weld stud welded to a curved plate.

Figure 8 illustrates an application, wherein a stud 10′ is welded to a curved surface plate 11′ having a boss 31 thereon. In this instance the pin 21′ terminates entirely within the wall 20′ prior to welding. The stud is very similar to that illustrated in Figures 5 and 6 in that it has the outer wall, the pin and a ferrule receiving cavity within the outer wall and about the pin. The pin prior to welding has a length sufficiently long to engage the boss 31 and hold the outer wall 20′ away from the curved surface plate 11'. During welding the pin is melted sufficiently by the arc to permit the outer wall to seat tightly against the curved surface plate 11'.

Figure 9:
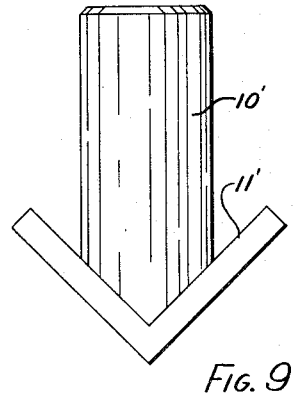
Figure 9 is an elevational view of a concealed weld stud welded to the inside corner of a work piece.

Figure 9 illustrates an application wherein the stud is welded into a valley such as the inside of an angle iron.

In this method of securing a large stud to a plate by a concealed weld the post or stud is provided with a circumferential wall and a pin which terminates in a welding end. In each instance the pin is of sufficient length so that the welding end thereof, prior to welding, touches the plate or work with the end surface of the outer wall spaced from the surface of that work piece. A ferrule is then inserted around the pin and within the wall and an arc is established between the pin and the plate to melt the end of the pin. The arc is within the ferrule. Finally the post or stud is plunged or pushed towards the plate to seat the wall against the plate and to seat the molten end of the pin into the plate. When the molten end of the pin is seated into the plate, some of the molten material is molded by the ferrule into a weld fillet extending around the pin. With this method there is no weld fillet on the outside of the post or stud and the outside surface of the post or stud and the surface of the plate meet in a sharp clean corner.

The method of securing the stud to the plate described herein will work when the stud is made with the pin and wall integrally joined as illustrated or when the pin and wall are made from separate pieces mechanically joined together prior to welding.

Although this invention has been described in its preferred form with a certain degree of particularity, it is understood that the present disclosure has been made by way of example and that numerous modifications and changes in the details may be resorted to without departing from the spirit and scope of the invention as defined in the following claims which I made a part hereof.

I claim:

1. A concealed weld stud comprising, a body having a circumferential wall and a pin terminating beyond the wall in a weld end, said wall and said pin being spaced apart to provide a ferrule receiving recess about said pin, and a ferrule about said weld end and in said recess.

2. The structure as defined in claim 4 including a spring in said recess urging the ferrule out of the recess.

3. The structure as defined in claim 1 including an annular cavity in the ferrule to receive and mold molten material formed from the weld end of the pin into a weld fillet, said cavity and the weld end of the pin extending beyond the wall having approximately equal volumes.

4. A concealed weld stud comprising, a body having a circumferential wall and a pin terminating in a weld end, said wall and said pin being spaced apart to provide a ferrule receiving recess about said pin and a ferrule about said weld end and in said recess.

References Cited in the file of this patent

UNITED STATES PATENTS

| | | |
|---|---|---|
| Re. 22,411 | Nelson | Dec. 21, 1943 |
| 1,004,795 | Lachman | Oct. 3, 1911 |